US012592452B2

(12) United States Patent
Abe et al.

(10) Patent No.: US 12,592,452 B2
(45) Date of Patent: Mar. 31, 2026

(54) SEPARATOR CUTTING DEVICE AND SEPARATOR CUTTING METHOD

(71) Applicant: Panasonic Holdings Corporation, Osaka (JP)

(72) Inventors: Ryuta Abe, Osaka (JP); Tatsuya Masada, Hyogo (JP)

(73) Assignee: Panasonic Holdings Corporation, Osaka (JP)

( * ) Notice: Subject to any disclaimer, the term of this patent is extended or adjusted under 35 U.S.C. 154(b) by 619 days.

(21) Appl. No.: 18/014,720

(22) PCT Filed: Jun. 9, 2021

(86) PCT No.: PCT/JP2021/021960
§ 371 (c)(1),
(2) Date: Jan. 5, 2023

(87) PCT Pub. No.: WO2022/009594
PCT Pub. Date: Jan. 13, 2022

(65) Prior Publication Data
US 2023/0352797 A1      Nov. 2, 2023

(30) Foreign Application Priority Data

Jul. 10, 2020      (JP) ................................. 2020-118896

(51) Int. Cl.
 *H01M 50/406* (2021.01)
 *H01M 10/04* (2006.01)
(52) U.S. Cl.
 CPC ..... *H01M 50/406* (2021.01); *H01M 10/0404* (2013.01); *H01M 2220/20* (2013.01)

(58) Field of Classification Search
 CPC ........... H01M 50/406; H01M 10/0404; H01M 2220/20; H01M 10/404; H01M 4/139; H01M 10/04; H01M 4/0435; H01M 4/0163; H01M 10/058; B26D 7/10; B26D 5/32; B26D 5/24; B26D 7/20; B25B 11/005;
(Continued)

(56) References Cited

U.S. PATENT DOCUMENTS

| | | | | |
|---|---|---|---|---|
| 2002/0007552 | A1* | 1/2002 | Singleton | .......... H01M 10/0436 29/730 |
| 2021/0305629 | A1* | 9/2021 | May | .................... H01M 8/2404 |
| 2022/0093903 | A1* | 3/2022 | Rust | ................... B23K 26/0846 |

FOREIGN PATENT DOCUMENTS

| | | |
|---|---|---|
| JP | 2002-035982 A | 2/2002 |
| JP | 2013-179035 A | 9/2013 |

(Continued)

OTHER PUBLICATIONS

International Search Report issued in corresponding International Application No. PCT/JP2021/021960, dated Aug. 31, 2021, with English translation.

*Primary Examiner* — Ghassem Alie
(74) *Attorney, Agent, or Firm* — Rimon P.C.

(57) ABSTRACT

A separator cutting device includes: a conveyance unit for conveying a continuous body of separators for batteries; a tension applying mechanism for applying tension to at least a portion of the continuous body in the conveyance direction of the continuous body; and a laser irradiation unit for irradiating the portion of the continuous body onto which the tension has been applied by the tension applying mechanism with a laser beam so as to divide the continuous body into a plurality of separators.

3 Claims, 2 Drawing Sheets

100

(58) Field of Classification Search
CPC ..... Y02E 60/10; Y02P 70/50; B23K 26/0846;
B23K 2101/16
USPC .................... 83/13, 155, 353, 451, 581, 648
See application file for complete search history.

(56) References Cited

FOREIGN PATENT DOCUMENTS

| | | | |
|---|---|---|---|
| JP | 2015-072785 A | 4/2015 | |
| KR | 20160047216 A | * 5/2016 ............. H01M 4/04 |

* cited by examiner

1

SEPARATOR CUTTING DEVICE AND SEPARATOR CUTTING METHOD

CROSS-REFERENCE TO RELATED APPLICATIONS

This application is the U.S. National Phase under 35 U.S.C. § 371 of International Patent Application No. PCT/JP2021/021960, filed on Jun. 9, 2021, which in turn claims the benefit of Japanese Patent Application No. 2020-118896, filed on Jul. 10, 2020, the entire content of each of which is incorporated herein by reference.

BACKGROUND

Field of the Invention

The present disclosure relates to separator cutting devices and separator cutting methods.

Description of the Related Art

As in-vehicle batteries, for example, laminate-type batteries have been developed. Such a battery has a structure in which a container contains a laminated electrode assembly, in which multiple positive electrodes and multiple negative electrodes are alternatively laminated with a separator in between, and an electrolyte. The formation of the laminated electrode assembly may involve the work of cutting a continuous separator into individual pieces. For example, Patent Literature 1 discloses a separator cutting device that irradiates a long separator base material (separator continuous body) with laser beams so as to divide the separator base material into individual rectangular separator pieces.

Patent Literature 1: Japanese Unexamined Patent Application Publication NO. 2015-72785

In recent years, with the spread of electric vehicles, mobile terminals, etc., shipments of batteries have been on the rise, and there is a need to improve battery production lead time and throughput. Therefore, there is a demand to shorten the cutting time of the separator continuous body. One possible method for shortening the cutting time of the continuous body is to increase the scanning speed of laser beams. However, when the scanning speed of the laser beams is increased, the energy density applied to a cutting site of the continuous body decreases, making the cutting difficult. In contrast, although increasing the output intensity of the laser beams is one possible option, more expensive laser equipment is required in this case, which may lead to an increase in cost.

SUMMARY OF THE INVENTION

In this background, a purpose of the present disclosure is to provide a technology for shortening the cutting time of a separator continuous body without relying on an increase in the output intensity of a laser beam.

One embodiment of the present disclosure relates to a separator cutting device. This device includes: a conveyance unit that conveys a continuous body of separators for batteries; a tension applying mechanism that applies tension to at least a portion of the continuous body in a conveyance direction of the continuous body; and a laser irradiation unit that irradiates the portion of the continuous body onto which the tension has been applied by the tension applying mechanism with a laser beam so as to divide the continuous body into a plurality of separators.

One embodiment of the present disclosure relates to a separator cutting method. This method includes: conveying a continuous body of separators for batteries; applying tension to at least a portion of the continuous body in a conveyance direction of the continuous body; and irradiating the portion of the continuous body onto which the tension has been applied with a laser beam so as to divide the continuous body into a plurality of separators.

Optional combinations of the aforementioned constituting elements, and implementations of the present disclosure in the form of methods, apparatuses, and systems may also be practiced as additional modes of the present disclosure.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
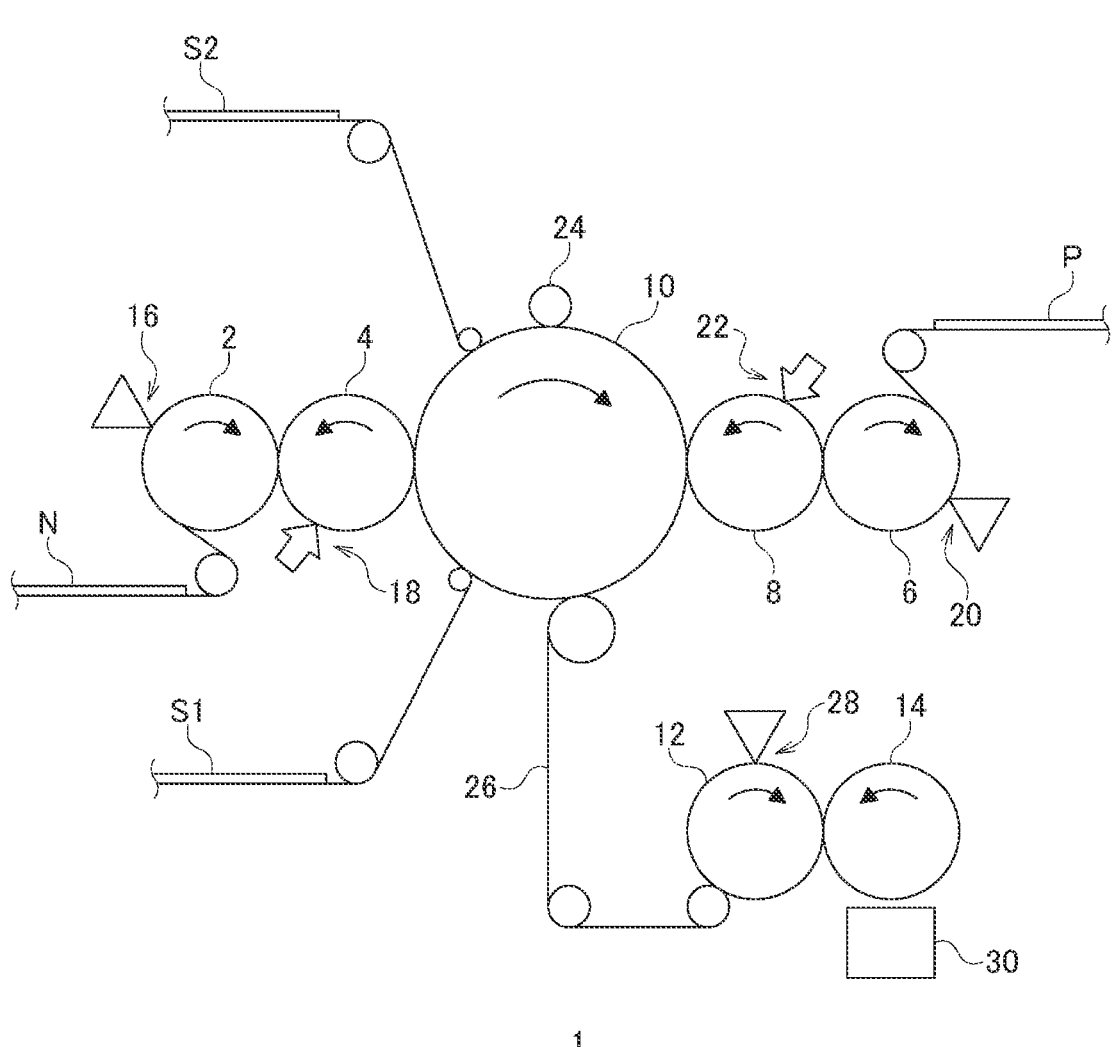
FIG. 1 is a schematic diagram of a laminated electrode assembly manufacturing device.

Hereinafter, the present disclosure will be described based on a preferred embodiment with reference to the figures. The embodiments do not limit the present disclosure and are shown for illustrative purposes, and not all the features described in the embodiments and combinations thereof are necessarily essential to the present disclosure. The same or equivalent constituting elements, members, and processes illustrated in each drawing shall be denoted by the same reference numerals, and duplicative explanations will be omitted appropriately.

The scales and shapes shown in the figures are defined for convenience's sake to make the explanation easy and shall not be interpreted limitatively unless otherwise specified. Terms like "first", "second", etc., used in the specification and claims do not indicate an order or importance by any means unless specified otherwise and are used to distinguish a certain feature from the others. Some of the components in each figure may be omitted if they are not important for explanation.

FIG. 1 is a schematic diagram of a laminated electrode assembly manufacturing device 1. The laminated electrode assembly manufacturing device 1 is a continuous drum-type manufacturing device in which multiple drums are combined, as an example. Performing each process of cutting, heating, bonding, laminating, and the like of electrode bodies and separators on the drums enables high-speed and continuous manufacturing of laminated electrode assemblies. The laminated electrode assemblies may be used, for example, for lithium-ion secondary batteries. The structure of the laminated electrode assembly manufacturing device 1 is not limited to a continuous drum-type.

The laminated electrode assembly manufacturing device 1 includes a first electrode cutting drum 2, a first electrode heating drum 4, a second electrode cutting drum 6, a second electrode heating drum 8, a bonding drum 10, a separator cutting drum 12, and a laminating drum 14.

The first electrode cutting drum 2 is a drum for cutting a continuous body of multiple first electrode plates into multiple individual first electrode plates and conveying the plates. In the present embodiment, the first electrode is a negative electrode. To the first electrode cutting drum 2, a strip-shaped first electrode continuous body N, which is the continuous body of multiple first electrode plates, is supplied. The first electrode continuous body N includes a first electrode current collector and a first electrode active material layer. The first electrode active material layer is laminated on the first electrode current collector. In the present embodiment, the first electrode active material layer is laminated on both sides of the first electrode current collector. However, the first electrode active material layer may be laminated on only one side of the first electrode current collector.

Each of the first electrode current collector and the first electrode active material layer can be made of a publicly-known material and has a publicly-known structure. The first electrode current collector is constituted by, for example, foil or a porous body made of copper, aluminum, or the like. The first electrode active material layer is formed by applying, onto a surface of the first electrode current collector, first electrode mixture slurry containing a first electrode active material, a binder, a dispersant, and the like and by drying and rolling the applied film. The thickness of the first electrode current collector is in the range from 3 μm to 50 μm inclusive, for example. The thickness of the first electrode active material layer is in the range from 10 μm to 100 μm inclusive, for example.

The first electrode cutting drum 2 has multiple holding heads arranged in a circumferential direction of the drum and a cutting blade that cuts the first electrode continuous body N. Each of the multiple holding heads has a holding surface that adsorbs and holds the first electrode continuous body N. The holding surface of each holding head faces outward from the first electrode cutting drum 2. The first electrode continuous body N supplied to the first electrode cutting drum 2 is conveyed by the rotation of the first electrode cutting drum 2 while being adsorbed and held by the holding surfaces of the multiple holding heads.

Each of the multiple holding heads rotates around the central axis of the first electrode cutting drum 2 and can also move in a circumferential direction of the drum independently of other holding heads. Relative movement of each holding head is achieved by mounting thereon a motor that is different from the motor used to rotate the first electrode cutting drum 2. The independent driving of the holding heads enables adjustment of the positions of cutting by the cutting blade in the first electrode continuous body N and also enables adjustment of the positions of the individually divided first electrode plates, for example.

The first electrode cutting drum 2 adsorbs and holds the supplied first electrode continuous body N and rotates to convey the first electrode continuous body N. At a cutting position 16 schematically illustrated in FIG. 1, the first electrode cutting drum 2 cuts the first electrode continuous body N. The first electrode continuous body N is cut by the cutting blade at a position between adjacent holding heads, so that multiple individual first electrode plates are obtained. Each first electrode plate thus obtained is conveyed while being adsorbed and held by each holding head. The positions of the multiple produced first electrode plates are monitored by a camera or the like.

The first electrode heating drum 4 is disposed in close proximity to the first electrode cutting drum 2. Before the proximity position between the first electrode cutting drum 2 and the first electrode heating drum 4, the speed of a holding head of the first electrode cutting drum 2 is temporarily increased or decreased until it becomes substantially identical with the linear velocity of the first electrode heating drum 4. As a result, the relative speed of the holding head with respect to the first electrode heating drum 4 becomes substantially zero. At the time when the relative speed becomes substantially zero, the holding head discharges, to the first electrode heating drum 4 side, the first electrode plate that the holding head has adsorbed and held.

The first electrode heating drum 4 rotates while adsorbing and holding the first electrode plates discharged from the first electrode cutting drum 2 and preheats the first electrode plates with a built-in heater. The preheating is performed to thermally bond a first electrode plate and a separator in the subsequent bonding process. Although the first electrode plates are heated at a heating position 18 in the present embodiment, the position is not limited thereto. For example, the first electrode plates may be heated in the entire circumferential area of the first electrode heating drum 4.

The second electrode cutting drum 6 is a drum for cutting a continuous body of multiple second electrode plates into multiple individual second electrode plates and conveying the plates. In the present embodiment, the second electrode is a positive electrode. To the second electrode cutting drum 6, a strip-shaped second electrode continuous body P, which is the continuous body of multiple second electrode plates, is supplied. The second electrode continuous body P includes a second electrode current collector and a second electrode active material layer. The second electrode active material layer is laminated on the second electrode current collector. In the present embodiment, the second electrode active material layer is laminated on both sides of the second electrode current collector, but the second electrode active material layer may be laminated on only one side of the second electrode current collector.

Each of the second electrode current collector and the second electrode active material layer can be made of a publicly-known material and has a publicly-known structure. The second electrode current collector is constituted by, for example, foil or a porous body made of stainless steel, aluminum, or the like. The second electrode active material layer is formed by applying, onto a surface of the second electrode current collector, second electrode mixture slurry containing a second electrode active material, a binder, a dispersant, and the like and by drying and rolling the applied film. The thickness of the second electrode current collector is in the range from 3 μm to 50 μm inclusive, for example. Also, the thickness of the second electrode active material layer may be in the range from 10 μm to 100 μm inclusive, for example.

The second electrode cutting drum 6 has multiple holding heads arranged in a circumferential direction of the drum and a cutting blade that cuts the second electrode continuous body P. Each of the multiple holding heads has a holding surface that adsorbs and holds the second electrode continuous body P. The holding surface of each holding head faces outward from the second electrode cutting drum 6. The second electrode continuous body P supplied to the second electrode cutting drum 6 is conveyed by the rotation of the second electrode cutting drum 6 while being adsorbed and held by the holding surfaces of the multiple holding heads.

Each of the multiple holding heads rotates around the central axis of the second electrode cutting drum 6 and can also move in a circumferential direction of the drum independently of other holding heads. Relative movement of each holding head is achieved by mounting thereon a motor that is different from the motor used to rotate the second electrode cutting drum 6. The independent driving of the holding heads enables adjustment of the positions of cutting by the cutting blade in the second electrode continuous body P and also enables adjustment of the positions of the individually divided second electrode plates, for example.

The second electrode cutting drum 6 adsorbs and holds the supplied second electrode continuous body P and rotates to convey the second electrode continuous body P. At a cutting position 20 schematically illustrated in FIG. 1, the second electrode cutting drum 6 cuts the second electrode continuous body P. The second electrode continuous body P is cut by the cutting blade at a position between adjacent holding heads, so that multiple individual second electrode plates are obtained. Each second electrode plate thus obtained is conveyed while being adsorbed and held by each holding head. The positions of the multiple produced second electrode plates are monitored by a camera or the like.

The second electrode heating drum 8 is disposed in close proximity to the second electrode cutting drum 6. Before the proximity position between the second electrode cutting drum 6 and the second electrode heating drum 8, the speed of a holding head of the second electrode cutting drum 6 is temporarily increased or decreased until it becomes substantially identical with the linear velocity of the second electrode heating drum 8. As a result, the relative speed of the holding head with respect to the second electrode heating drum 8 becomes substantially zero. At the time when the relative speed becomes substantially zero, the holding head discharges, to the second electrode heating drum 8 side, the second electrode plate that the holding head has adsorbed and held.

The second electrode heating drum 8 rotates while adsorbing and holding the second electrode plates discharged from the second electrode cutting drum 6 and preheats the second electrode plates with a built-in heater. The preheating is performed to thermally bond a second electrode plate and a separator in the subsequent bonding process. Although the second electrode plates are heated at a heating position 22 in the present embodiment, the position is not limited thereto. For example, the second electrode plates may be heated in the entire circumferential area of the second electrode heating drum 8.

The bonding drum 10 is a drum that forms a continuous laminated body 26 in which multiple unit laminated bodies are continuous. Each unit laminated body is constituted by a first separator, a first electrode plate, a second separator, and a second electrode plate. To the bonding drum 10, a strip-shaped first separator continuous body S1, in which multiple first separators are continuously arranged, and a strip-shaped second separator continuous body S2, in which multiple second separators are continuously arranged, are supplied. On a surface of each of the first separator continuous body S1 and the second separator continuous body S2, a thermal bonding layer is provided. The thermal bonding layer has a property of developing no adhesiveness at room temperature but developing adhesiveness when heated. The thermal bonding layer may be, for example, a thermoplastic layer containing a thermoplastic polymer, which develops adhesiveness based on plastic deformation of the thermoplastic polymer caused by heating.

Further, the bonding drum 10 is disposed in close proximity to the first electrode heating drum 4 and the second electrode heating drum 8. Then, to the bonding drum 10, multiple first electrode plates are supplied from the first electrode cutting drum 2 via the first electrode heating drum 4, and multiple second electrode plates are supplied from the second electrode cutting drum 6 via the second electrode heating drum 8. A first electrode plate is rotationally conveyed while being preheated on the first electrode heating drum 4 and is discharged, to the bonding drum 10 side, at the proximity position between the first electrode heating drum 4 and the bonding drum 10. A second electrode plate is rotationally conveyed while being preheated on the second electrode heating drum 8 and is discharged, to the bonding drum 10 side, at the proximity position between the second electrode heating drum 8 and the bonding drum 10.

The first separator continuous body S1, each first electrode plate, the second separator continuous body S2, and each second electrode plate are supplied to the bonding drum 10 at positions provided in the enumerated order from the upstream side of the rotational direction of the bonding drum 10. Accordingly, the first separator continuous body S1 is supplied to the bonding drum 10 first at a certain position. The first separator continuous body S1 is adsorbed and held by the bonding drum 10 and rotationally conveyed. Subsequently, at a position on the downstream side of the supply position of the first separator continuous body S1, the first electrode plates are supplied from the first electrode heating drum 4 to the bonding drum 10 and placed on the first separator continuous body S1. The multiple first electrode plates are arranged on the first separator continuous body S1 at predetermined intervals in the conveying direction of the first separator continuous body S1.

Subsequently, at a position on the downstream side of the supply position of the first electrode plates, the second separator continuous body S2 is supplied to the bonding drum 10 and placed over the multiple first electrode plates. Thereafter, the first separator continuous body S1, multiple first electrode plates, and second separator continuous body S2 are pressurized by a thermocompression bonding roller 24, at a position on the downstream side of the supply position of the second separator continuous body S2. Accordingly, the first separator continuous body S1, each first electrode plate, and the second separator continuous body S2 are bonded together. Subsequently, at a position on the downstream side of the position of pressure bonding by the thermocompression bonding roller 24, the second electrode plates are supplied from the second electrode heating drum 8 to the bonding drum 10 and placed on the second separator continuous body S2. The multiple second electrode plates are arranged on the second separator continuous body S2 at predetermined intervals in the conveying direction of the second separator continuous body S2. Also, the multiple second electrode plates are bonded to the second separator continuous body S2 by the pressing force of the second electrode heating drum 8.

Through the process described above, the first separator continuous body S1, multiple first electrode plates, second separator continuous body S2, and multiple second electrode plates are laminated in this order and bonded to each other, forming a continuous laminated body 26. The continuous laminated body 26 has a structure in which the unit laminated bodies, which each are constituted by a first separator, a first electrode plate, a second separator, and a second electrode plate, are continuously connected by the first separator continuous body S1 and the second separator continuous body S2. The continuous laminated body 26 is conveyed from the bonding drum 10 to the separator cutting drum 12. By halting the supply of the second electrode plates from the second electrode cutting drum 6 side, three-layered unit laminated bodies without the second electrode plates may be produced after every fixed number of pieces. The electrode plates of which supply is halted may also be the first electrode plates.

The separator cutting drum 12 is a drum that cuts the first separator continuous body S1 and the second separator continuous body S2 in the continuous laminated body 26 to obtain multiple individual unit laminated bodies. The separator cutting drum 12 adsorbs and holds the continuous laminated body 26 by multiple holding heads arranged in a circumferential direction of the drum and conveys the continuous laminated body 26 by the rotation of the drum. At a cutting position 28 schematically illustrated in FIG. 1, the separator cutting drum 12 cuts the continuous laminated body 26. The continuous laminated body 26 is cut at a position between adjacent holding heads, so that multiple individual unit laminated bodies are obtained. At the time, in the continuous laminated body 26, the first separator continuous body S1 and the second separator continuous body S2 are cut at a position between electrode plates that are adjacent in the conveying direction of the continuous laminated body 26.

Each unit laminated body thus obtained is conveyed while being adsorbed and held by each holding head. A holding head discharges, to the laminating drum 14 side, a unit laminated body that the holding head has adsorbed and held. The positions of the multiple produced unit laminated bodies are monitored by a camera or the like. The structure of the separator cutting drum 12 will be explained later in detail.

The laminating drum 14 is a drum that laminates multiple unit laminated bodies on a lamination stage 30 to form a laminated electrode assembly. The laminating drum 14 includes multiple laminating heads arranged in a circumferential direction of the drum. Each laminating head includes a holding surface that adsorbs and holds a unit laminated body. The holding surface of each laminating head faces outward from the laminating drum 14. Each of the multiple laminating heads rotates around the central axis of the laminating drum 14 and advances sequentially to a laminating position facing the lamination stage 30. The laminating head reaching the laminating position discharges, onto the lamination stage 30, a unit laminated body that the laminating head has been holding.

The lamination stage 30 is disposed immediately beneath the laminating drum 14. On the lamination stage 30, the unit laminated bodies discharged from each laminating head of the laminating drum 14 are sequentially laminated. Thus, a laminated electrode assembly is formed. The lamination stage 30 can be driven in an X-axis direction and a Y-axis direction perpendicular to each other. Also, a tilt angle on an X-Y plane of the lamination stage 30 can be adjusted. This enables adjustment of the positions in the X-axis direction and the Y-axis direction and the tilt angle of a unit laminated body discharged from the laminating drum 14, with respect to a unit laminated body already laminated on the lamination stage 30.

Figure 2:
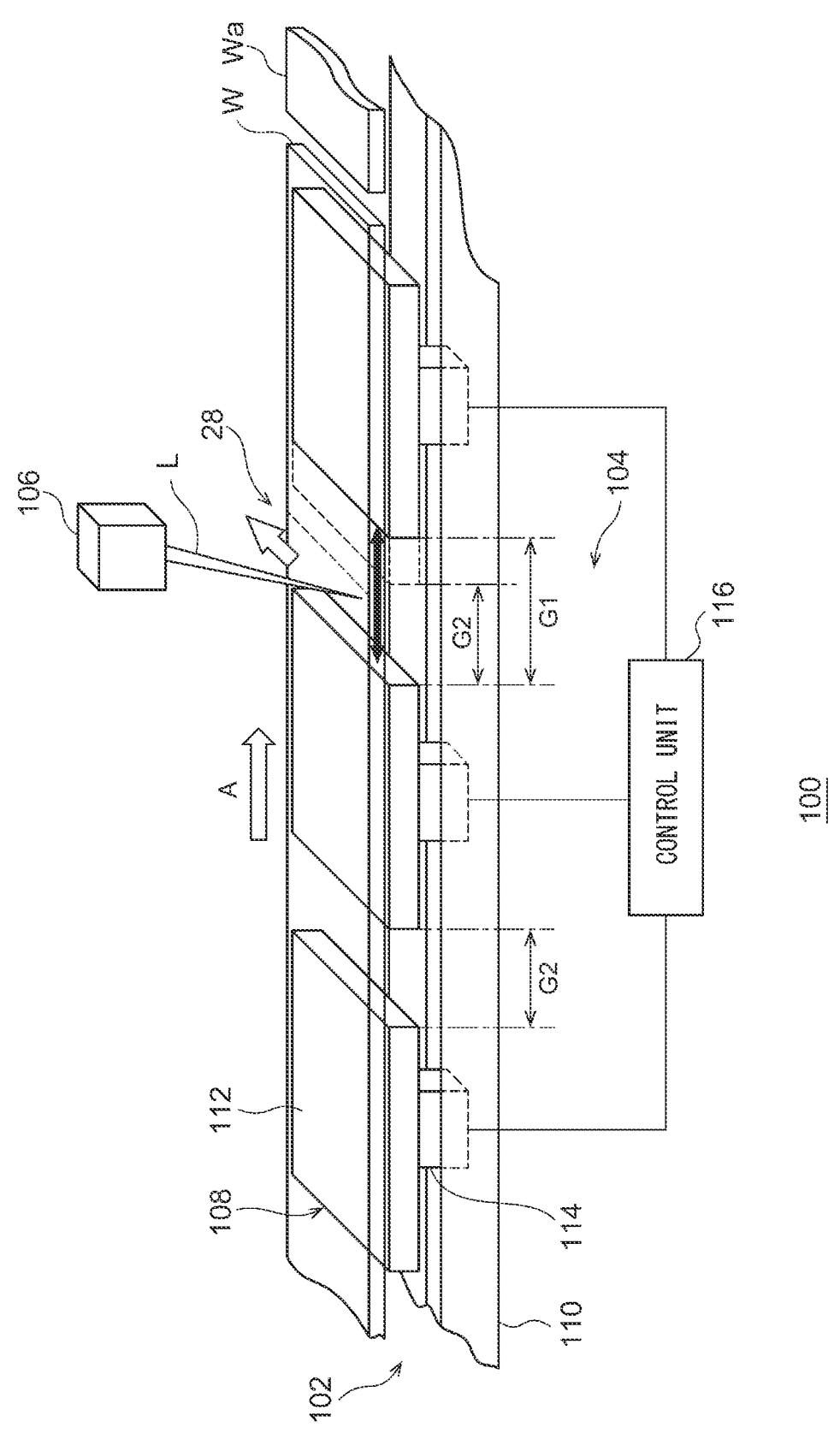
FIG. 2 is a schematic diagram showing a part of a separator cutting device according to an embodiment.

The separator cutting drum 12 is composed of a separator cutting device 100 according to the present embodiment. FIG. 2 is a schematic diagram showing a part of the separator cutting device 100 according to the embodiment. FIG. 2 shows a transparent view of a continuous body W. The separator cutting device 100 includes a conveyance unit 102, a tension applying mechanism 104, and a laser irradiation unit 106.

The conveyance unit 102 conveys the continuous body W of separators Wa for batteries. When the separator cutting device 100 constitutes the separator cutting drum 12, the continuous body W corresponds to the first separator continuous body S1 and the second separator continuous body S2 in the continuous laminated body 26. Further, the separators Wa correspond to the first separator and the second separator in a unit laminated body. The continuous body W may be a first separator continuous body S1 or a second separator continuous body S2 alone.

The conveyance unit 102 according to the present embodiment has multiple holding heads 108 and a drum section 110. The multiple holding heads 108 each hold the continuous body W. Each of the holding heads 108 has a holding surface 112 that holds the continuous body W. For example, the holding surface 112 has a suction mechanism for sucking an atmosphere gas such as air and can adsorb and hold the continuous body W.

The drum section 110 is discoid (see FIG. 1), and multiple holding heads 108 are arranged on the circumference at substantially equal intervals. FIG. 2 schematically illustrates the drum section 110 in a flat shape. The holding surface 112 of each holding head 108 arranged on the drum section 110 faces outward in a radial direction of the drum section 110. A driving mechanism (not shown) such as a motor is coupled to the central axis such that the drum section 110 can rotate around the central axis.

The drum section 110 rotates so as to advance each holding head 108 toward and past the cutting position 28. This allows the continuous body W to be continuously conveyed to the cutting position 28. The cutting position 28 is a position where the drum section 110 and the laser irradiating unit 106 (more strictly, an emission port through which a laser beam L is emitted toward the drum section 110) face each other.

The tension applying mechanism 104 applies tension to at least a portion of the continuous body W in the conveyance direction A of the continuous body W. The tension applying mechanism 104 according to the present embodiment displaces two adjacent holding heads 108 relative to each other in the circumferential direction of the drum section 110 so as to widen the distance between the two holding heads 108, thereby applying tension to the continuous body W in a conveyed state. For example, the tension applying mechanism 104 widens an interval G1 between two holding heads 108 arranged with the cutting position 28 therebetween to be larger than an interval G2 between two holding heads 108 arranged in another region. This applies tension to a portion of the continuous body W located at the cutting position 28.

In order to achieve such application of tension, the tension applying mechanism 104 has multiple motors 114 provided in each holding head 108 and a control unit 116 that controls driving of each motor 114. As the motors 114, publicly-known stepping motors and the like can be used. Each holding head 108 is connected to the drum section 110 via a motor 114. Each motor 114 moves each holding head 108 independently of a movement caused by the rotation of the drum section 110. Therefore, each holding head 108 rotates around the central axis of the drum section 110 due to the rotation of the drum section 110 and is also capable of moving in a circumferential direction of the drum section 110 independently of other holding heads 108 according to the driving of the motor 114.

In order to widen the interval G1 between two holding heads 108 adjacent to each other with the cutting position 28 located therebetween, the control unit 116 controls the driving of motors 114 provided in the corresponding holding heads 108. In FIG. 2, the control unit 116 is depicted as a functional block. This functional block may be implemented by an element such as a CPU or memory of a computer or by a circuit as a hardware configuration, and by a computer program or the like as a software configuration. Therefore, it will be obvious to those skilled in the art that the functional blocks may be implemented in a variety of manners by a combination of hardware and software. The control unit 116 can also control the driving of each motor 114 based on a preset operation program.

For example, the multiple holding heads 108 adsorb and hold the continuous body W while being arranged at intervals G2. Then, a holding head 108 that has reached the cutting position 28 passes through the cutting position 28 while accelerating more than the subsequent holding heads 108. This widens the interval G1 between two holding heads 108 arranged with the cutting position 28 therebetween to be larger than the interval G2 between two holding heads 108 arranged in another region. As a result, tension is applied to a portion of the continuous body W in a conveyed state that extends to the cutting position 28.

The widening of the interval between two adjacent holding heads 108 can also be achieved by a cam mechanism that includes a cam groove that does not follow the rotation of the drum section 110 and a projecting section that is provided on each holding head 108 and engaged with the cam groove. Further, the tension applying mechanism 104 may be formed to apply tension to the continuous body W before the continuous body W is supplied to the conveyance unit 102, and the conveyance unit 102 may be formed to convey the continuous body W while maintaining the tension. In this case, the tension applying mechanism 104 can be constituted by, for example, a combination of nip rolls, suction rolls, dancer rolls, etc., provided in the supply line that supplies the continuous body W to the conveyance unit 102.

The conveyance unit 102 is not limited to a roll type in which the continuous body W is conveyed in the circumferential direction of the drum section 110 and may also be of a stage type in which the continuous body W is conveyed in the horizontal direction or the like, for example. In this case, the tension applying mechanism 104 may be constituted by a combination of nip rolls, suction rolls, dancer rolls, etc., provided in the conveyance unit 102.

The tension applying mechanism 104 may also apply tension to a portion of the continuous body W other than the portion extending to the cutting position 28. For example, tension may be applied to the entire continuous body W by an unwinder located at the upstream end of the conveyance line of the continuous body W and a winder located at the downstream end. However, as in the present embodiment, application of tension locally, separately from the tension applied to the continuous body W as the continuous body W is conveyed, is more preferable since desired tension can be applied more reliably and more easily to the portion of the continuous body W extending to the cutting position 28.

The magnitude of the tension applied per unit area of the cross-section perpendicular to the conveyance direction A of the continuous body W is preferably 1.9 $N/mm^2$ or more, more preferably 2.9 $N/mm^2$ or more, and even more preferably 3.8 $N/mm^2$ or more, and even more preferably 4.8 $N/mm^2$ or more. Setting the tension to 1.9 $N/mm^2$ or more allows the continuous body W to be more easily cut when the irradiation conditions of a laser beam L are set to, for example, an output of 100 W and a scanning speed of 5000 mm/s. The inventors of the present invention have confirmed that the continuous body W cannot be cut if no tension is applied to the continuous body W under the same irradiation conditions (excluding the tension applied to the continuous body W as the continuous body W is conveyed).

The laser irradiation unit 106 irradiates a laser beam L onto the continuous body W at the cutting position 28. Therefore, a portion of the continuous body W onto which tension has been applied by the tension applying mechanism 104 is irradiated with the laser beam L. This causes the continuous body W to be cut and divided into multiple separators Wa. When the separator cutting device 100 constitutes the separator cutting drum 12, the first separator continuous body S1 and the second separator continuous body S2 included in the continuous laminated body 26 are cut into multiple individual unit laminated bodies.

The laser irradiation unit 106 has a publicly-known laser oscillator. The type of the laser oscillator can be selected appropriately according to the material of the continuous body W to be cut. The continuous body W to be cut in the present embodiment has a base material layer and a heat-resistant layer covering the surface of the base material layer. The base material layer is constituted by resin such as polyethylene (PE), polyethylene terephthalate (PET), and polypropylene (PP). The heat-resistant layer has heat resistance at least higher than that of the base material layer and is constituted by, for example, ceramics such as bae-mite, magnesium oxide, or barium sulfate or heat-resistant resin such as aramid. A $CO_2$ laser oscillator is exemplified as a laser oscillator suitable for cutting such a continuous body W. The continuous body does not have to have a heat-resistant layer. The laser oscillator is not limited to a $CO_2$ laser oscillator.

When the continuous body W is irradiated with a laser beam L, the continuous body W is heated and softened. Thereby, at the cutting position 28, the breaking strength of the continuous body W decreases to or below the tension applied by the tension applying mechanism 104, and the continuous body W is thus cut. In other words, the continuous body W is cut by the synergistic action of the laser beam L and the tension. Therefore, the energy density required for cutting the continuous body W can be reduced. Thus, for example, even when the cutting of the continuous body W cannot be performed without the application of tension when the scanning speed of the laser beam L is increased while the output intensity of the laser beam L remains the same, the continuous body W can be cut by the application of tension. The magnitude of the tension applied by the tension applying mechanism 104 can be set appropriately based on experiments and simulations performed by the designer according to the output intensity of a laser beam L, scanning speed, and the like.

As explained above, the separator cutting device 100 according to the present embodiment includes: a conveyance unit 102 for conveying a continuous body W of separators Wa for batteries; a tension applying mechanism 104 for applying tension to at least a portion of the continuous body W in the conveyance direction A of the continuous body W; and a laser irradiation unit 106 for irradiating the portion of the continuous body W onto which the tension has been applied by the tension applying mechanism 104 with a laser beam L so as to divide the continuous body W into multiple separators Wa.

When the scanning speed of a laser beam L is increased in order to shorten the cutting time of the continuous body W, the energy density applied to the continuous body W decreases. Attempting to compensate for this by increasing the output intensity of a laser beam L may lead to an increase in the cost of manufacturing equipment for the battery. Further, since the base material layer made of resin is susceptible to thermal denaturation, increasing the output intensity of a laser beam L can cause adverse effects. For example, the thermal denaturation of the separators Wa may prevent the electrode reaction from occurring properly. Some batteries are equipped with a safety function that stops the electrode reaction due to thermal denaturation of the separators Wa when excessively heated. However, this safety function may not operate properly. Also, surrounding separators Wa may be damaged by separators Wa hardened due to thermal denaturation.

In contrast, in the separator cutting device 100 according to the present embodiment, tension is applied to the continuous body W by the tension applying mechanism 104 at the time of the cutting of the continuous body W. This allows the separators Wa to be separated from the continuous body W along a portion softened by the irradiation with a laser beam L. Therefore, the scanning speed of a laser beam L can be increased since the continuous body W can be cut with a lower energy density. Therefore, according to the separator cutting device 100 of the present embodiment, the cutting time of the continuous body W can be reduced without relying on an increase in the output intensity of a laser beam L. As a result, the production lead time and throughput can be improved while keeping battery production costs low.

The conveyance unit 102 according to the present embodiment has multiple holding heads 108, which hold a continuous body W, and a drum section 110, on which multiple holding heads 108 are arranged and which rotates to advance each holding head 108 toward a cutting position 28 facing the laser irradiation unit 106. The tension applying mechanism 104 applies tension to the continuous body W by widening the interval G1 between two adjacent holding heads 108. The tension applying mechanism 104 has multiple motors 114, which move each holding head 108 independently of a movement caused by the rotation of the drum section 110, and a control unit 116, which controls the driving of each motor 114. The control unit 116 controls the driving of the motors 114 to widen the interval between two adjacent holding heads 108. These allow the desired tension to be applied more reliably and more easily to a portion of the continuous body W irradiated with a laser beam L.

Described above is a detailed explanation on the embodiments of the present disclosure. The above-described embodiments merely show specific examples for carrying out the present disclosure. The details of the embodiments do not limit the technical scope of the present disclosure, and many design modifications such as change, addition, deletion, etc., of the constituent elements may be made without departing from the spirit of the present disclosure defined in the claims. New embodiments resulting from added design change will provide the advantages of the embodiments and variations that are combined. In the above-described embodiments, the details for which such design change is possible are emphasized with the notations "according to the embodiment", "in the embodiment", etc. However, design change is also allowed for those without such notations. Optional combinations of the above constituting elements are also valid as embodiments of the present disclosure. Hatching applied to a cross section of a drawing does not limit the material of an object to which the hatching is applied.

The inventions according to the above-described embodiments may be defined by the items described in the following.

[Item 1]

A separator cutting method comprising:

conveying a continuous body (W) of separators (Wa) for batteries;

applying tension to at least a portion of the continuous body (W) in a conveyance direction (A) of the continuous body (W); and irradiating the portion of the continuous body (W) onto which the tension has been applied with a laser beam (L) so as to divide the continuous body (W) into a plurality of separators (Wa).

The invention claimed is:

1. A separator cutting method comprising:

conveying a continuous body of separators for batteries;

applying tension to at least a portion of the continuous body in a conveyance direction of the continuous body; and irradiating by a laser irradiation unit the portion of the continuous body onto which the tension has been applied with a laser beam so as to divide the continuous body into a plurality of separators, wherein the conveying is performed by a conveyance unit that includes a plurality of holding heads that hold the continuous body and a drum section on which the plurality of holding heads are arranged and which rotates to advance each holding head toward a cutting position facing the laser irradiation unit, and wherein the plurality of holding heads arranged at intervals advance toward the cutting position while holding the continuous body, and wherein the applying of tension includes causing the holding head that has reached the cutting position to pass through the cutting position while an acceleration greater than an acceleration of subsequent holding heads, thereby widening the interval between two holding heads arranged with the cutting position therebetween to be larger than the interval between two holding heads arranged in a region other than the cutting position, and applying tension to a portion of the continuous body in a conveyed state that extends to the cutting position.

2. A separator cutting device comprising:

a conveyance unit that conveys a continuous body of separators for batteries;

a tension applying mechanism that applies tension to at least a portion of the continuous body in a conveyance direction of the continuous body; and a laser irradiation unit that irradiates the portion of the continuous body onto which the tension has been applied by the tension applying mechanism with a laser beam so as to divide the continuous body into a plurality of separators, wherein the conveyance unit has a plurality of holding heads that hold the continuous body and a drum section on which the plurality of holding heads are arranged and which rotates to advance each holding head toward a cutting position facing the laser irradiation unit, and wherein the tension applying mechanism applies tension to the continuous body by widening an interval between two adjacent holding heads, wherein the plurality of holding heads arranged at intervals advance toward the cutting position while holding the continuous body, and wherein the tension applying mechanism causes the holding head that has reached the cutting position to pass through the cutting position with an acceleration greater than an acceleration of subsequent holding heads, thereby widening the interval between two holding heads arranged with the cutting position therebetween to be larger than the interval between two holding heads arranged in a region other than the cutting position, and applying tension to a portion of the continuous body in a conveyed state that extends to the cutting position.

3. The separator cutting device according to claim 2, wherein the tension applying mechanism has a plurality of motors that move each holding head independently of a movement caused by the rotation of the drum section and a control unit that controls motors, and the control unit controls the motors to widen the interval between the two adjacent holding heads.

* * * * *